Sept. 25, 1962 E. J. BRAUNER 3,056,086
SQUELCH CIRCUIT
Filed Sept. 14, 1959 2 Sheets-Sheet 1

INVENTOR.
EDWARD J. BRAUNER
BY Isidore Match
ATTORNEY

Sept. 25, 1962 E. J. BRAUNER 3,056,086

SQUELCH CIRCUIT

Filed Sept. 14, 1959 2 Sheets-Sheet 2

INVENTOR.

EDWARD J. BRAUNER

BY Isidore Match

ATTORNEY

United States Patent Office 3,056,086
Patented Sept. 25, 1962

3,056,086
SQUELCH CIRCUIT
Edward J. Brauner, Lynchburg, Va., assignor to General Electric Company, a corporation of New York
Filed Sept. 14, 1959, Ser. No. 839,739
15 Claims. (Cl. 325—319)

Figure 1:
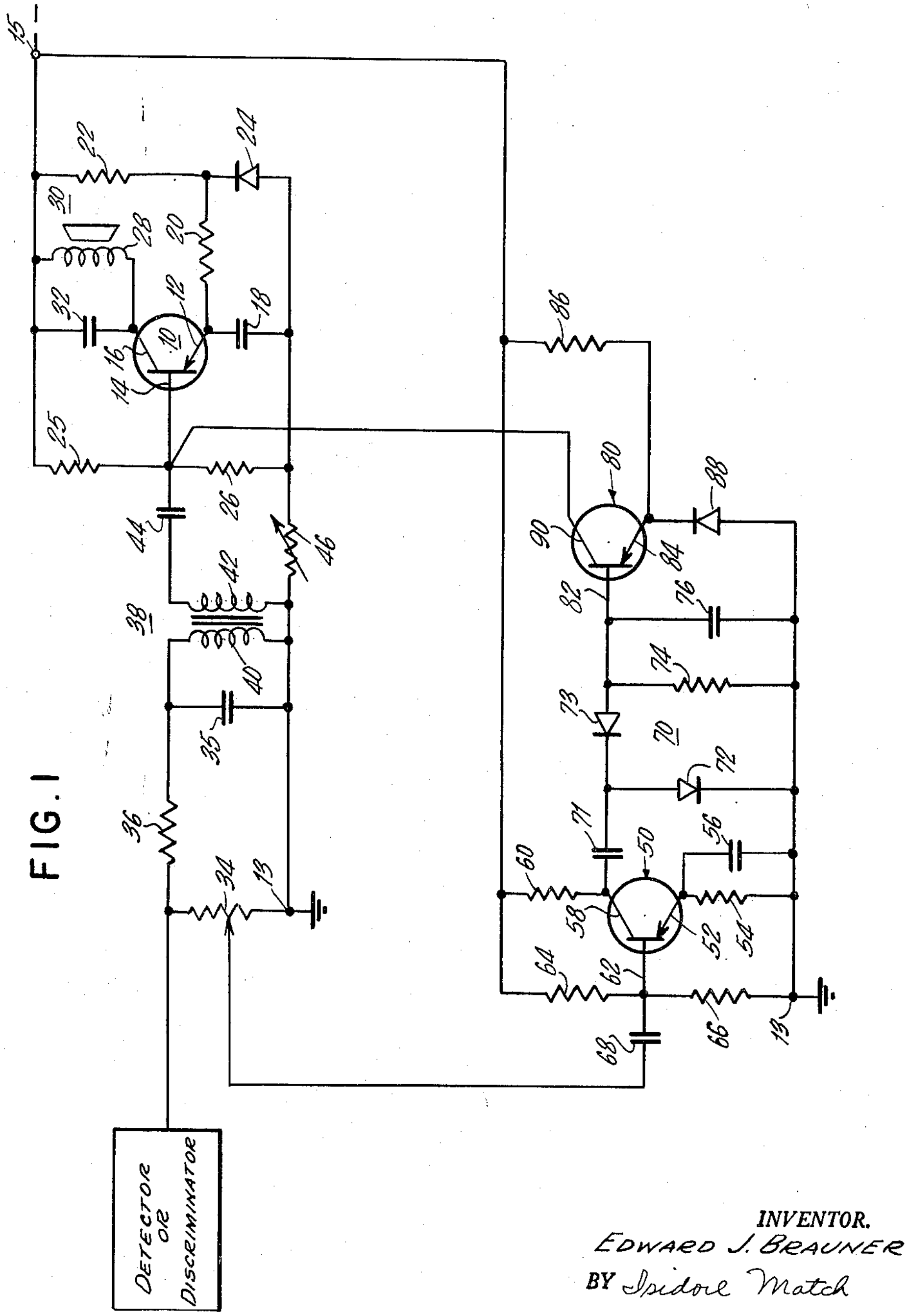

This invention relates to squelch circuits. More particularly, it relates to an improved squelch circuit and audio amplifier.

In those situations wherein a portable radio receiver is utilized and wherein the receiver is continually in the on condition, it is necessary to eliminate the noise appearing at the output when no audio signal is received. Such elimination is usually accomplished with the use of a "squelch" circuit. Where this type receiver is substantially miniaturized, it is desirable to utilize transistors as the active elements in the receiver circuit both for their small size and relatively low power requirement. In some cases in such receivers, a same earpiece associated therewith may be used both as an earpiece at low volume and a lapel speaker at high volume. Thus, it is desirable in such miniaturized portable receivers to provide a receiving circuit wherein there is effected a minimizing of the number of transistors utilized, wherein the circuit operates at a low current drain, and wherein supply voltage drain may be varied directly with the output volume.

Accordingly, it is an object of the present invention to provide an improved transistorized squelch circuit.

It is a further object to provide a transistorized squelch circuit, in accordance with the preceding object, in conjunction with a transistor audio amplifier wherein the total amount of transistor stages is substantially optimally minimized and wherein the circuits operate at a low current drain.

It is another object of the invention to provide a circuit in accordance with the preceding objects wherein the drain from the voltage supply such as a battery can be varied with the volume of the output of the audio amplifier.

Generally speaking and in accordance with the invention, there is provided in a receiver normally conditioned to be in a receptive state and wherein there is included means for detecting the modulated signals from a received carrier wave, a circuit for amplifying signals and for squelching noise from the output of the detecting means in the absence of a received carrier wave. The circuit comprises first, second and third transistors, a unidirectional potential supply source and means for applying operated biasing potentials from the supply source to the electrodes of the transistors. There are provided first means for coupling the output of the detecting means as an input to the first transistor and second means for coupling the output of the detecting means as an input to the second transistor, the second coupling means presenting an impedance to the output of the detecting means which varies inversely with the frequency of such output. Included in the circuit is means for deriving from the output of the second transistor in response to a noise input thereto, a substantially unidirectional potential and for applying the latter undirectional potential as an input to the third transistor, the polarity of the last named unidirectional potential being so chosen as to render the third transistor relatively heavily conductive upon its application thereto. Means are provided for applying the output of the third transistor produced as a result of the input thereto of the unidirectional potential as an input to the first transistor, the polarity of the output of the third transistor being so chosen as to render the first transistor non-conductive.

The features of this invention, which are believed to be new, are set forth with particularity in the appended claims. The invention itself, however, may best be understood by reference to the following description when taken in conjunction with the accompanying drawing which show embodiments of a squelch circuit according to the invention.

Figure 2:
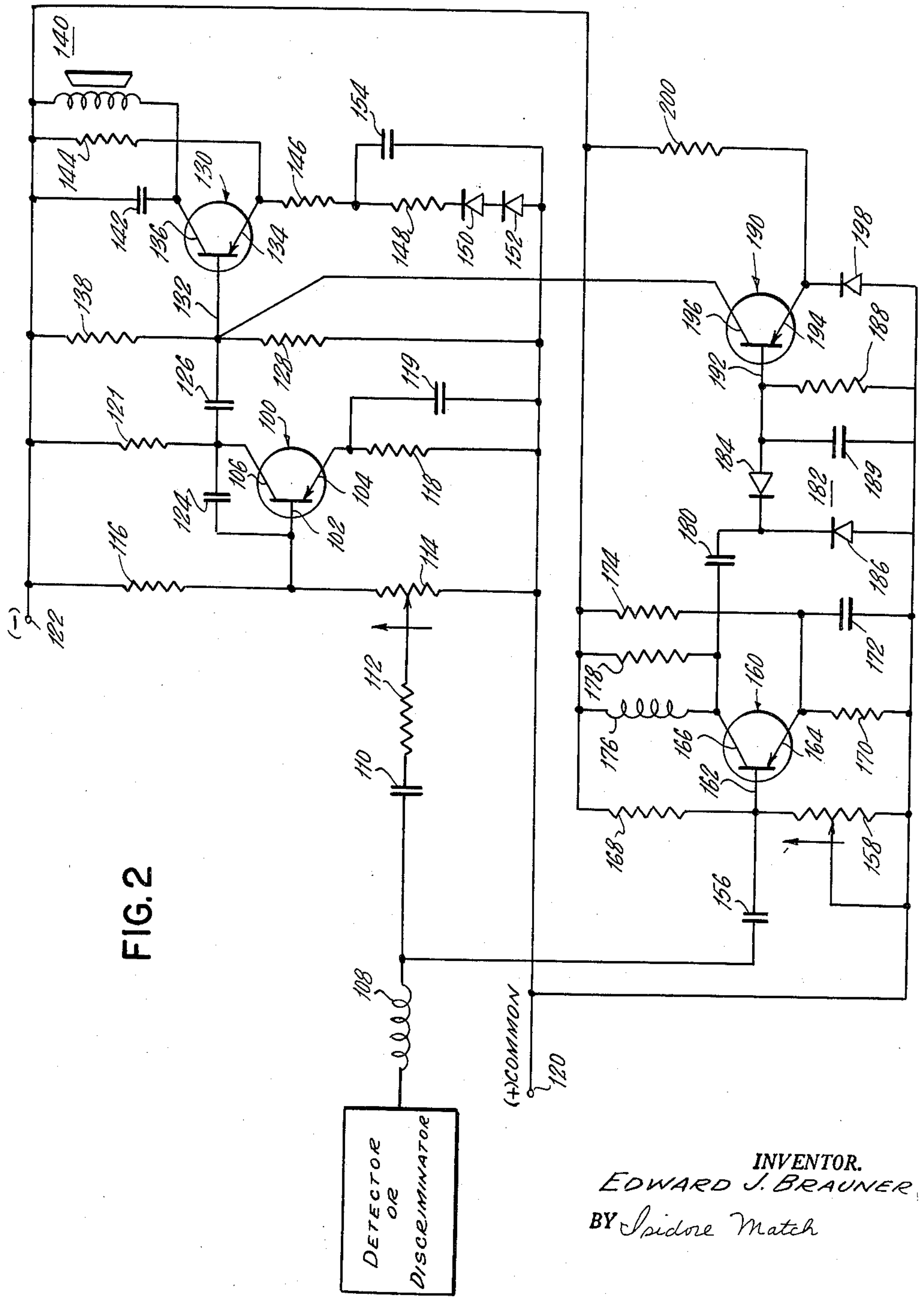

In the drawing, FIG. 1 is a schematic depiction of an embodiment of a squelch circuit in association with an audio amplifier according to the invention; and FIG. 2 is a schematic diagram of another embodiment of a circuit in accordance with the invention.

Referring now to FIG. 1, the input to the circuit is from the output of a detector stage such as a discriminator. The circuit comprises a transistor 10, having an emitter electrode 12, a base electrode 14, and a collector electrode 16. Emitter electrode 12 is connected to the common terminal 13, of a unidirectional potential source through a capacitor 18 and a potentiometer 46. Emitter electrode 12 is also connected to the negative terminal 15 of the potential source through a resistor 20 and a resistor 22, the junction of resistors 20 and 22 being connected to the cathode of a diode 24, the anode of which is connected to the junction of potentiometer 46 and capacitor 18.

Base electrode 14 is connected to common terminal 13 through a resistor 26 and a potentiometer 46 and to negative terminal 15 through a resistor 25. Collector electrode 16 is connected to the negative terminal 15 through the coil 28 of an earpiece 30, coil 28 being shunted by a capacitor 32. The input to base 14 of transistor 10 which is the audio amplifier transistor in this circuit is developed across a potentiometer 34 and applied thereto through a resistor 36, a transformer 38, comprising a primary winding 40 and a secondary winding 42, and a capacitor 44. Connected between the junction of resistor 26 and secondary winding 42 is potentiometer 46, the function of which will be further explained hereinbelow. A filtering capacitor 35 is provided in shunt with primary winding 40.

The squelch circuit portion of the circuit of FIG. 1 comprises transistors 50 and 80. Transistor 50 comprises an emitter electrode 52 connected to common terminal 13 through a resistor 54 shunted by a capacitor 56, a collector electrode 58 connected to negative terminal 15 through a resistor 60 and a base electrode 62 connected to the negative terminal 15 through a resistor 64 and to common terminal 13 through a resistor 66. The input to base electrode 62 is applied from a tap on potentiometer 34 through a capacitor 68.

The output from collector electrode 58 is applied through a capactior 71 to the base 82 of transistor 80 through a rectifier 70. Rectifier 70 comprises a parallel connected diode 72 having its anode connected to capacitor 71 and its cathode connected to common terminal 13 and a series connected diode 73, having its cathode connected to the junction of capacitor 71 and the anode of diode 72 and its anode connected to base electrode 82. Connected from base electrode 82 of transistor 80 to common terminal 13 is a resistor 74 and a capacitor 76.

Transistor 80 comprises an emitter electrode 84 connected to the negative terminal 15 through a resistor 86 and connected to the common terminal 13 through a diode 88 which is poled to have its anode connected to common terminal 13 and its cathode connected to emitter electrode 84. The collector electrode 90 of transistor 80 is connected to base electrode 14 of audio transistor 10.

In considering the operation of the circuit depicted in FIG. 1, let it be assumed that no signal is present at the output of the detector or discriminator stage. In this situation, the noise output thereat is applied to base electrode 62 of transistor 50 from potentiometer 34. The amplified noise output from collector electrode 58 is rectified by diodes 72 and 73 whereby only negative outputs from collector electrode 58 are applied as inputs to base electrode 82. Since transistor 80 as shown in the drawing has been chosen to be a junction transistor of the PNP conductivity type or a point contact transistor, the consequent driving negative of base electrode 82 enhances conduction in transistor 80, i.e. if transistor 80 is normally cut off, it is then driven into heavy conductivity and if it normally conducts in the quiescent state the conduction therein is greatly increased. Accordingly, a positive output from collector electrode 90 is applied to base electrode 14 of transistor 10 and of sufficient magnitude to render transistor 10 non-conductive.

Simultaneously with the application of the noise output of the detector or discriminator as an input to transistor 50 from potentiometer 34, such noise is also applied as an input to audio amplifier transistor 10. The noise voltage is developed across potentiometer 34 and is applied through resistor 36, transformer 38, and capacitor 44 to base electrode 14. This input applied to transistor 10 results in no output therefrom since simultaneously there is applied to base electrode 14 the positive output from collector electrode 90. As transistor 10 in the circuit also has been chosen to be a junction transistor of PNP type conductivity or a point contact transistor, the relatively high positive output from collector electrode 90 applied to base electrode 14 biases transistor 10 to collector current cutoff and consequently, no output occurs therefrom. Thus when no signal is present at the input to the circuit, the noise is prevented from appearing at the output of the audio amplifier.

Considering now the situation when there is an audio signal applied to the circuit, in such situation, the noise output from the detector or discriminator is decreased. Capacitor 68 is chosen to have a sufficiently small value so that audio signals applied to base electrode 62 are reduced as compared to noise signals applied thereto. In addition, the gain of transistor 50 is substantially reduced at low frequencies because the bypass capacitor 56 for emitter electrode 52 is also chosen to be small to cause degeneration of audio frequency signals. Thus when an audio signal is present, the signal applied to transistor 50 is of a quite low value and the output thereof which is applied as an input to base electrode 82 of transistor 80 is less negative than the biasing potential applied to emitter electrode 84 whereby transistor 80 is non-conductive. With transistor 80 non-conductive, no output therefrom is applied to base electrode 14 of transistor 10 and the biasing potentials applied to the electrodes of transistor 10 permit it to function as an amplifier of audio signals.

Diode 24 and resistor 22 provide biasing potentials for emitter electrode 12 and enable a sharp switching from cutoff to amplifying conditions in transistor 10 and thus increase the degree of squelch obtainable. Potentiometer 46 controls the output of audio transistor 10 by reducing both the audio signal voltage which is applied to base electrode 14 and the unidirectional voltage applied to base electrode 14 and transistor 10. Thus, as the value of the resistance of potentiometer 46 is increased, the volume of the audio output and the direct current drain from the voltage supply are decreased. Potentiometer 46 also serves as a negative feedback path, such negative feedback serving to reduce any distortion of the audio output as the volume is reduced. Potentiometer 34 enables the control of the noise input to transistor 50 and allows the level of the input thereto to be set at a point where the output is just squelched when no audio signal is present.

In the squelch circuit portion, capacitor 56 in shunt with emitter resistor 54 serves the function of the bypass capacitor, capacitor 76 is a filter capacitor and resistor 74 is a biasing resistor for base electrode 82.

In the circuit of FIG. 2, in the audio amplifier portion, the output from the detector or discriminator is applied as an input to the base electrode 102 of a transistor 100 through a series arrangement of an inductor 108 which functions as a radio frequency choke to remove intermediate frequency signals from the input to the audio and squelch circuits, a capacitor 110 and a resistor 112. The input to base electrode 102 is developed across a potentiometer 114 through which base electrode 102 is returned to the common terminal 120 of a unidirectional potential source (not shown). Base electrode 102 is also connected to the negative terminal 122 of the potential source through a resistor 116. The emitter electrode 104 of transistor 100 is connected to terminal 120 through a resistor 118 bypassed by a capacitor 119 and the collector electrode 106 is connected to negative terminal 122 through a resistor 121. A capacitor 124 is provided connected between base electrode 102 and collector electrode 106. Transistor 100 and its associated circuit elements is an audio amplifier, potentiometer 114 also serving as a volume control and resistor 112 is included in the input to prevent a too heavy loading of the discriminator by the following circuitry.

The output of transistor 100 at collector electrode 106 is applied as an input to the base electrode 132 of a transistor 130 through a capacitor 126, transistor 130 and its associated circuit elements also comprising an audio amplifier. Base electrode 132 is returned to common terminal 120 through a resistor 128 and is connected to negative terminal 122 through a resistor 138. The collector electrode 136 is connected to negative terminal 122 through the coil of an earpiece 140, the coil being shunted by a capacitor 142. The emitter electrode is connected to common terminal 120 through a series arrangement of resistor 146 and 148 and the cathode to anode paths of diodes 150 and 152, the junction of resistors 146 and 148 being bypassed to common by a capacitor 154, and to negative terminal 122 through a resistor 144.

In the squelch portion of the circuit, the output of the discriminator is applied as an input to the base electrode 162 of a transistor 160 through radio frequency choke 108 and a capacitor 156. Base electrode 162 is returned to common terminal 120 through a potentiometer 158 and connected to negative terminal 122 through a resistor 168. The emitter electrode 164 is connected to common terminal 120 through a resistor 170 bypassed by a capacitor 172 and to negative terminal 122 through a resistor 174. The collector electrode 166 is connected to negative terminal 122 through a parallel arrangement of an inductor 176 and a resistor 178. The output at collector electrode 166 is applied to the base electrode 192 of a transistor 190 through a coupling capacitor 180 and a rectifier 182.

Rectifier 182 comprises a series connected diode 184 having its cathode connected to capacitor 180 and its anode connected to base electrode 192 and a parallel connected diode 186 having its anode connected to common terminal 120 and its cathode connected to the junction of capacitor 180 and diode 184. The emitter electrode 194 is connected to common terminal 120 through the cathode to anode path of a diode 198 and is connected to negative terminal 122 through a resistor 200. Base electrode 192 is returned to common terminal 120 through a resistor 188, a filtering capacitor 189 being provided in shunt therewith.

The operation of the circuit of FIG. 2 is substantially similar to the operation of the circuit of FIG. 1. Thus, when no signal is present at the input of the detector or discriminator, the noise output thereat is applied to base electrode 162 of transistor 160 through radio frequency choke 108 and capacitor 156. Potentiometer 158 is utilized to control the gain of transistor 160 and serves the same function as that served by potentiometer 34 in the circuit of FIG. 1. The amplified noise output from collector electrode 166 is rectified by diodes 184 and 186 whereby only negative outputs from collector electrode 166 are applied as inputs to base electrode 192 of transistor 190. Since transistor 190, as shown in FIG. 2, has been chosen to be a junction transistor of the PNP conductivity type, the consequent driving negative of base electrode 192 enhances conduction in transistor 190. Accordingly, a positive output from collector electrode 196 is applied to base electrode 132 of transistor 130 and of sufficient magnitude to render transistor 130 nonconductive.

Simultaneously with the application of the noise signals to transistor 160, such noise is also applied as an input to audio amplifier transistor 100. This input is amplified and the output of transistor 100 is applied as an input to transistor 130. The input to transistor 130 results in no output therefrom since simultaneously there is applied to base electrode 132, the positive output from collector electrode 196. As transistor 130 in the circuit of FIG. 2 also has been chosen to be a junction transistor of the PNP conductivity type, the relatively high positive output from collector electrode 196 applied to base electrode 132 biases transistor 130 to collector current cutoff and, consequently, no output occurs therefrom.

In the situation where there is an audio signal applied to the circuit, the noise output from the detector or discriminator is decreased. Similar to the value of capacitor 68 in the circuit of FIG. 1, capacitor 156 is chosen to have a sufficiently small value so that audio signals applied to base electrode 162 of transistor 160 are substantially reduced in amplitude as compared to noise signals applied thereto. In addition, the gain of transistor 160 is substantially reduced at low frequencies because the bypass capacitor 172 of emitter electrode 164, similar to capacitor 56 of the circuit of FIG. 1 is also chosen to be small to cause degeneration of audio frequency signals. Also, inductor 176 serves to still further reduce the gain of transistor 160 at low frequencies.

Thus, when an audio signal is present, the signal applied as an input to base electrode 192 of transistor 190 is less negative than the biasing potential applied to emitter electrode 194 whereby transistor 190 is rendered nonconductive. Consequently, no output therefrom is applied to base electrode 132 of transistor 130 and the biasing potentials applied to the electrodes of transistor 130 enable it to function as an amplifier of the audio signals from the output of transistor 100.

Diodes 150 and 152, and resistors 148, 146 and 144 provide biasing potentials for emitter electrode 134 and enable a sharp switching from cutoff to amplifying conditions in transistor 130. The use of two diodes at this place in the circuit of FIG. 2 as compared to one diode in the circuit of FIG. 1 provides a greater degree of cutoff of transistor 130 and permits complete squelching action. Resistors 144 and 146 provide stabilization of the direct current operating point of transistor 130 with respect to temperature variation, resistor 146 in addition providing alternating current feedback to reduce any distortion in the output of transistor 130. Volume control potentiometer 114 serves the purpose served by potentiometer 46 in the circuit of FIG. 1. The transformer 38 of the circuit of FIG. 1 is eliminated from the circuit of FIG. 2 and the audio amplifier including transistor 100 has been added to the latter circuit.

While there have been shown particular embodiments of this invention, it will of course be understood that it is not wished to be limited thereto since different modifications may be made both in the circuit arrangements and the instrumentalities employed, and it is contemplated in the appended claims to cover any such modifications as fall within the true spirit and scope of the invention.

What is claimed as new and desired to be secured by Letters Patent of the United States is:

1. In a receiver normally conditioned to be in a receptive state and wherein means are included for detecting the modulating signals from a received carrier wave, a circuit for amplifying said detected signals and for squelching noise from the output of said detecting means in the absence of a received carrier wave comprising first, second and third transistors, said first transistor comprising a signal translating means for the detected modulating signals, a unidirectional potential supply source, means for applying operating biasing potentials from said source to the electrodes of said transistors, first means for coupling the output of said detecting means as an input to said first transistor; second means for coupling the output of said detecting means as an input to said second transistor, said second coupling means presenting an impedance to the output of said detecting means which varies inversely with the frequency of the said output, means for deriving from the output of said second transistor, a substantially unidirectional potential in response to a noise input to said second transistor and for applying said unidirectional potential as an input to said third transistor, the polarity of said last named unidirectional potential being so chosen as to render said third transistor relatively heavily conductive upon its application thereto, means for applying the output of said third transistor produced in response to the input thereto of said unidirectional potential as an input to said first signal translating transistor, the polarity of said output of said third transistor being so chosen as to render said first transistor non-conductive, when no signal is present at the output of said detecting means.

2. In a receiver normally conditioned to be in a receptive state and wherein there is included means for detecting the modulating signals from a received carrier wave, a circuit for amplifying detected signals, and for squelching noise from the output of said detecting means in the absence of a received carrier wave comprising first, second and third transistors said first transistor comprising a signal amplifying means for the detected modulating signals, a unidirectional potential source, means for applying operating biasing potentials from said source to the electrodes of said transistors, first means for coupling the output of said detecting means as an input to said first transistor, second means for coupling a portion of the output of said detecting means as an input to said second transistor, said second coupling means presenting an impedance to the output of said detecting means which varies inversely with the frequency of said output, means for deriving from the output of said second transistor in response to a noise input thereto, a substantially unidirectional potential and for applying said unidirectional potential as an input to said third transistor, the polarity of said last-named unidirectional potential being so chosen as to render said third transistor relatively heavily conductive upon its application thereto, means for applying the output of said third transistor produced as a result of the input thereto of said unidirectional potential as an input to said first signal amplifying transistor, the polarity of said output of said third transistor being so chosen as to render the said first transistor non-conductive when no signal is present at the output of said detecting means and means in circuit with the input to said first transistor and said potential supply source for varying the gain of said first transistor and, correspondingly, varying the biasing potentials applied to the electrodes of said first transistor.

3. In a receiver normally conditioned to be in a receptive state and wherein there is included means for detecting the modulated signals from a received carrier wave, a circuit for amplifying said detected signals, and for squelching noise from the output of said detecting means in the absence of a received carrier wave comprising first, second and third transistors having emitter, base, and collector electrodes respectively said first transistor comprising a signal amplifying means for signals from said detecting means, a unidirectional potential source, means for applying operating biasing potentials to said respective electrodes from said source, first means for coupling the output of said detecting means as an input to said first base electrode, second means for coupling a portion of the output of said detecting means to said second base electrode, said second coupling means presenting an impedance to the output of said detecting means which varies inversely with the frequency of said last named output, means for deriving from the output of said second transistor in response to a noise input thereto, a substantially unidirectional potential and for applying said unidirectional potential as an input to said third base electrode, the polarity of said unidirectional potential being so chosen as to render said third transistor relatively heavily conductive, means for applying the output of said third transistor as an input to said first base electrode, the polarity of the output of said third transistor being so chosen as to render said first transistor non-conductive when no signal is present at the output of said detecting means, means in circuit with said first transistor, said potential supply source, and said first coupling means for simultaneously varying the gain of said first transistor and for varying the biasing potentials applied to the electrodes of said first transistor unidirectional conducting, means in circuit with said first signal amplifying transistor and said potential source for enabling a relatively sharp switching of said first signal amplifying transistor from the conductive state to the non-conductive state and unidirectional conducting means in circuit with said third transistor for enabling sharp switching of said third transistor from the conductive to the non-conductive state.

4. In a receiver as defined in claim 3, and further including means in circuit with said second emitter electrode and said supply source, for reducing the gain of said second transistor at relatively low frequencies.

5. In a receiver as defined in claim 4, wherein said second coupling means comprises a potentiometer connected across the input of said first transistor and a first capacitance connected in series with a point on said potentiometer and said second base electrode, said first capacitance presenting a relatively high impedance to signals of audio frequency and a relatively low impedance to noise.

6. In a receiver as defined in claim 5 wherein said means for deriving said unidirectional potential from the output of said second transistor comprises a rectifier for producing said unidirectional potential of said chosen polarity.

7. In a receiver as defined in claim 6 wherein said means for reducing the gain of said second transistor at said low frequency is a second capacitance connected in shunt with said second emitter electrode.

8. In a receiver as defined in claim 7 wherein said means for enabling the sharp switching of said first and third transistors from the non-conductive to the conductive state and vice versa comprises respective series arrangements of a diode and a resistance connected between the terminals of said potential source, said first and third emitter electrodes being connected to the respective junctions of said resistances and said diodes.

9. In a receiver as defined in claim 8 wherein said first coupling means includes a transformer comprising a primary and secondary winding connected between the output of said detecting means and said input to said first base electrode, and wherein said means for simultaneously varying the gain of said first transistor and correspondingly varying the biasing potentials applied to the electrodes of said first transistor comprises a variable resistance connected in circuit with said secondary winding and said first transistor.

10. In a receiver as defined in claim 9 wherein said first, second and third transistors are of the PNP type conductivity junction transistors and wherein said means for deriving said unidirectional potentials from the output of said second transistor is a rectifier for producing a negative unidirectional potential from said second transistor output.

11. In a receiver normally conditioned to be in a receptive state and wherein there is included means for detecting the modulated signals from a received carrier wave, and for squelching noise from the output of said detecting means in the absence of a received carrier wave, a circuit comprising first, second, third and fourth transistors having emitter base and collector electrodes respectively, a unidirectional potential source, means for applying operating biasing potentials to said respective electrodes from said source, first coupling means from the output of said detecting means to the said first base, second coupling means from the output of said detecting means to said second base electrode, said second coupling means presenting an impedance to the output of said detecting means which varies inversely with the frequency of said last named output, means for deriving from said second transistor in response to a noise input thereto, a substantially unidirectional potential and for applying said unidirectional potential as input to said third base electrode, the polarity of said unidirectional potential being so chosen as to render said third transistor relatively heavily conductive, means for applying the output of said first transistor as an input to said fourth base electrode, means for applying the output of said third transistor as an input to said fourth base electrode, the polarity of the output of said third transistor being so chosen as to render said fourth transistor non-conductive when no signal is present at the output of said detecting means, means in circuit with said second transistor for varying the gain of said second transistor, means in circuit with said first transistor for varying the gain of said first transistor, third means in circuit with said fourth transistor and said potential source for enabling a relatively sharp switching of said fourth transistor from the conductive to the non-conductive state and fourth means in circuit with said third transistor for enabling a sharp switching of said third transistor from the conductive to the non-conductive state.

12. In a receiver as defined in claim 11, and further including a capaictance in circuit with said second emitter electrode and an inductance in circuit with said second collector electrode and said potential source for reducing the gain of said second transistor at relatively low frequencies.

13. In a receiver as defined in claim 12 and further including feedback means in circuit with one of the electrodes of said fourth transistor.

14. In a receiver as defined in claim 13 wherein said third means includes a series arrangement of a plurality of similarly poled diodes in circuit with said potential source and said fourth emitter electrode.

15. In a circuit as defined in claim 14, wherein both of said first and second coupling means include a common inductance wihch presents a relatively high impedance to intermediate frequency signals in the output of said detecting means.

References Cited in the file of this patent

UNITED STATES PATENTS

| | | |
|---|---|---|
| 2,239,901 | Percival | Apr. 29, 1941 |
| 2,250,519 | Beers | July 29, 1941 |
| 2,343,115 | Noble | Feb. 29, 1944 |
| 2,447,564 | Carnahan | Aug. 24, 1948 |
| 2,785,298 | Menhennett | Mar. 12, 1957 |
| 2,794,156 | Mohler et al. | May 28, 1957 |
| 2,888,527 | Follensbee et al. | May 26, 1959 |
| 2,915,603 | Jacobsen | Dec. 1, 1959 |
| 2,930,890 | Lenk | Mar. 29, 1960 |

OTHER REFERENCES

Carlson: Abstract of Application #590,563, filed April 27, 1945, published 630 O.G. 282, January 3, 1950.

Voorhoeve: "Low-frequency Amplification," published 1953, page 169.